US012645999B2

(12) United States Patent
Kimura et al.

(10) Patent No.: US 12,645,999 B2
(45) Date of Patent: Jun. 2, 2026

(54) REWRITING METHOD AND INFORMATION PROCESSING APPARATUS

(71) Applicant: Fujitsu Limited, Kawasaki (JP)

(72) Inventors: Kosaku Kimura, Kawasaki (JP);
Shade Ruangwan, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 657 days.

(21) Appl. No.: 18/299,875

(22) Filed: Apr. 13, 2023

(65) Prior Publication Data

US 2023/0409976 A1      Dec. 21, 2023

(30) Foreign Application Priority Data

Jun. 16, 2022      (JP) ................................. 2022-096965

(51) Int. Cl.
| | |
|---|---|
| *G06N 20/00* | (2019.01) |
| *G06F 40/295* | (2020.01) |
| *G06F 40/30* | (2020.01) |
| *G06N 3/08* | (2023.01) |
| *G06N 3/082* | (2023.01) |
| *G06N 3/10* | (2006.01) |

(52) U.S. Cl.
CPC .......... *G06N 20/00* (2019.01); *G06F 40/295* (2020.01); *G06F 40/30* (2020.01); *G06N 3/08* (2013.01); *G06N 3/082* (2013.01); *G06N 3/10* (2013.01)

(58) Field of Classification Search
CPC .......... G06N 20/00; G06N 3/082; G06N 3/10; G06F 40/30; G06F 40/295
See application file for complete search history.

(56) References Cited

U.S. PATENT DOCUMENTS

| | | | |
|---|---|---|---|
| 2013/0073488 A1 | 3/2013 | Anderson et al. | |
| 2019/0034803 A1 | 1/2019 | Gotou | |
| 2019/0220778 A1 | 7/2019 | Murano et al. | |
| 2021/0132915 A1 | 5/2021 | Ivankovic et al. | |

FOREIGN PATENT DOCUMENTS

| | | |
|---|---|---|
| JP | 2019-28515 A | 2/2019 |
| WO | 2018/066074 A1 | 4/2018 |

OTHER PUBLICATIONS

Pranshu et al., NPL ("Algorithm Identification in Programming Assignments" Published May 2022 by ACM DL Digital Library (12 pages) (Year: 2022).*
Enrique et al., NPL ("Code Generation Using Machine Learning: A Systematic Review" Published Jan. 2022 by IEEE (2 pages) (Year: 2022).*

* cited by examiner

*Primary Examiner* — Quoc A Tran
(74) *Attorney, Agent, or Firm* — Fujitsu Intellectual Property Center

(57) ABSTRACT

A computer detects, based on a module name of a module included in a machine learning library, a first code for calling a training function for training a machine learning model from a machine learning program. The computer inserts, before the first code, second code for splitting first training data passed to the training function into second training data and test data. The computer rewrites the first code to pass the second training data to the training function. The computer inserts, after the first code, third code for calculating a score based on prediction data, which is generated from the trained machine learning model and input data included in the test data, and correct answer data included in the test data.

8 Claims, 9 Drawing Sheets

API DOCUMENT

131 sklearn.AAA: AAA models

AAA.AAAClassifier
    Parameters  ...
    Attributes  ...
    Methods      fit(X,y), predict(X), ...

AAA.AAARegressor
    Parameters  ...
    Attributes  ...
    Methods      fit(X,y), predict(X), ...

sklearn.BBB: BBB models

BB.BBBClassifier
    Parameters:  ...
    Attributes:  ...
    Methods:     fit(X,y), predict(X), ...

BBB.BBBRegressor
    Parameters:  ...
    Attributes:  ...
    Methods:     fit(X,y), predict(X), ...

CLASS NAME LIST

132

AAA.AAAClassifier

AAA.AAARegressor

BBB.BBBClassifier

BBB.BBBRegressor

FIG. 4

MACHINE LEARNING PROGRAM

133

```
1    model = AAAClassifier ( )

2

3    model.fit (X, y)

4

5    pred = model.predict (test, some_kw='foo')
```

134

```
1    model = AAAClassifier ( )

2

3    _X_train, _X_test, _y_train, _y_test = train_test_split (X, y, test_size=0.1)
4    model.fit(_X_train, _y_train)

5

6    pred = model.predict (test, some_kw='foo')
7    _y_pred = model.predict(_X_test, some_kw='foo')

8

9    printf (f 'accuracy={ accuracy_score(_y_pred, _y_test) }' ')
```

ABSTRACT SYNTAX TREE 150

REWRITING METHOD AND INFORMATION PROCESSING APPARATUS

CROSS-REFERENCE TO RELATED APPLICATION

This application is based upon and claims the benefit of priority of the prior Japanese Patent Application No. 2022-096965, filed on Jun. 16, 2022, the entire contents of which are incorporated herein by reference.

FIELD

The embodiments discussed herein relate to a rewriting method and an information processing apparatus.

BACKGROUND

A computer may perform machine learning, where training data is used to train a machine learning model. The training data may include input data, which is inputted into the machine learning model, and correct answer data, which corresponds to prediction data outputted by the machine learning model. The computer optimizes parameter values included in the machine learning model to reduce the error between the prediction data generated from the input data and the correct answer data.

A user who has a computer perform machine learning may generate a machine learning program that defines a machine learning procedure. Values of various adjustable settings, such as a method of preprocessing training data, the structure of the machine learning model, and hyperparameters for controlling the behavior of the machine learning algorithm are selected in this machine learning program. These adjustable settings affect the prediction accuracy of the machine learning model. For this reason, even when the task of the machine learning model and the training data in use are the same, the prediction accuracy may differ depending on the machine learning program.

An information processing apparatus has been proposed that divides a hierarchical program into a plurality of program elements, performs machine learning based on the attributes of the program elements and the hierarchy, and classifies the plurality of program elements into a plurality of groups.

See for example, International Publication Pamphlet No. WO2018/066074.

SUMMARY

According to an aspect, there is provided a non-transitory computer-readable recording medium storing therein a computer program that causes a computer to execute a process including: detecting, based on a module name of a module included in a machine learning library, first code for calling a training function for training a machine learning model from a machine learning program that uses the machine learning library; inserting, before the first code, second code for splitting first training data passed to the training function by the first code into second training data and test data; rewriting the first code to pass the second training data to the training function; and inserting, after the first code, third code for calculating a score based on prediction data, which is generated from the machine learning model that has been trained and input data included in the test data, and correct answer data included in the test data.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4 depicts one example of an API document and a class name list;

DESCRIPTION OF EMBODIMENTS

There are cases where it is desirable for a computer to calculate a score for an existing machine learning program. As this score, it is possible to use the prediction accuracy of a machine learning model that has been trained by this machine learning program. One example technology is AutoML (Auto Machine Learning) which reduces the burden placed on the user by allowing the user to designate the task of a machine learning model and training data and then generates a machine learning program that realizes the designated task. There are also cases where it is desirable for a computer to tune AutoML using existing machine learning programs that attain high scores, so that AutoML will thereafter generate high-quality machine learning programs.

Not all existing machine learning programs are written so as to automatically calculate a score. Here, it would be conceivable for users to manually edit existing machine learning programs so that a score is calculated during execution. However, understanding and manually editing an existing machine learning program presents a heavy burden on the user. For example, when a large number of existing machine learning programs have been collected for the purpose of tuning AutoML, manually editing such large number of machine learning programs represents a heavy burden on the user.

Several embodiments will now be described with reference to the accompanying drawings.

First Embodiment

A first embodiment will now be described.

Figure 1:
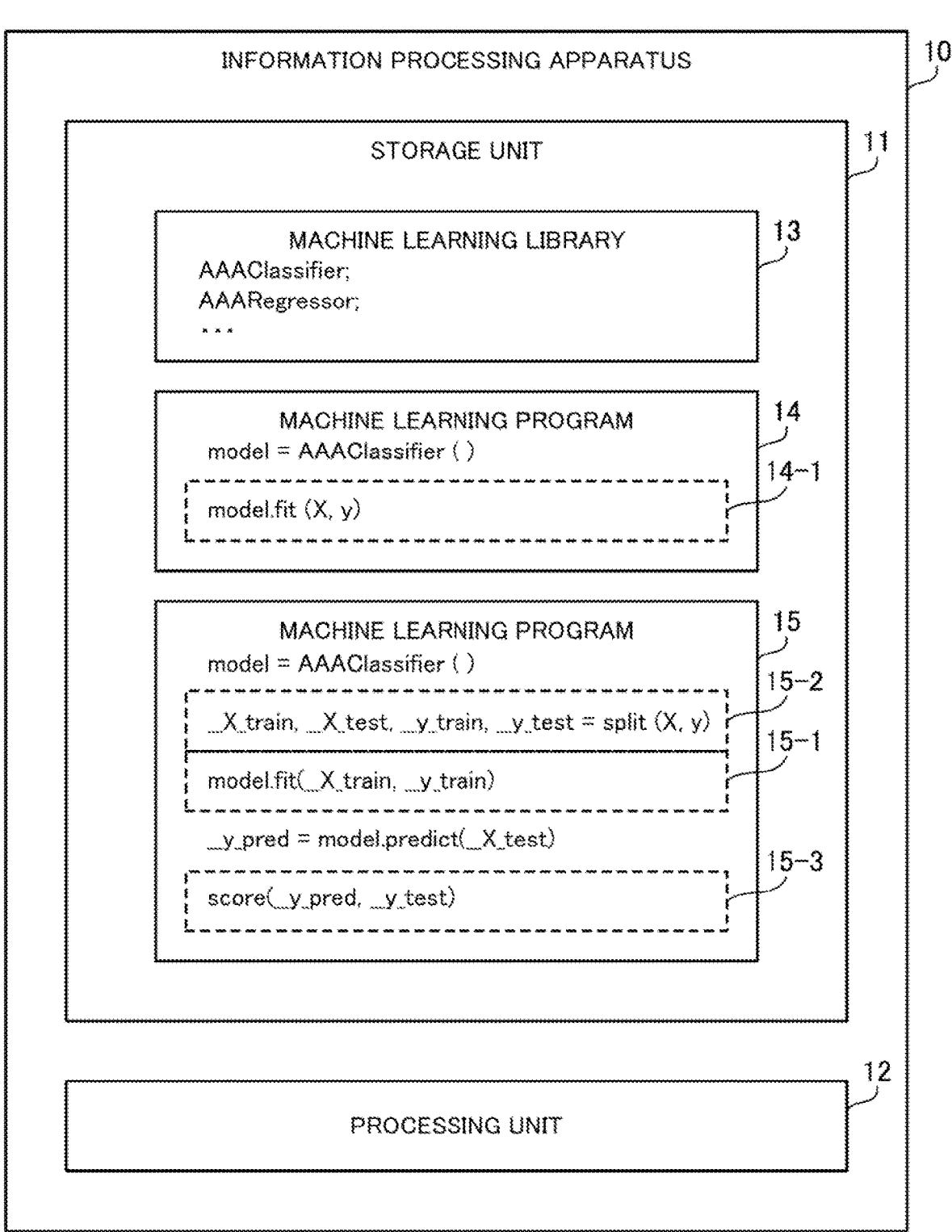
FIG. 1 depicts an information processing apparatus according to a first embodiment.

FIG. 1 depicts an information processing apparatus according to the first embodiment.

The information processing apparatus 10 according to the first embodiment rewrites a machine learning program so that a score is calculated during execution. The information processing apparatus 10 may rewrite each of a plurality of machine learning programs. The information processing apparatus 10 may also calculate the score for a machine learning program by executing a rewritten version of the machine learning program. The information processing apparatus 10 may also tune AutoML using machine learning programs that have been assigned scores. When the task of a machine learning model and training data have been indicated, AutoML generates a machine learning program for realizing that task. The information processing apparatus 10 may be a client apparatus or may be a server apparatus. The information processing apparatus 10 may be referred to as a "computer", a "rewriting apparatus", or a "machine learning apparatus".

The information processing apparatus 10 includes a storage unit 11 and a processing unit 12. The storage unit 11 may be volatile semiconductor memory, such as random access memory (RAM), or may be non-volatile storage, such as a hard disk drive (HDD) or flash memory. As examples, the processing unit 12 is a processor such as a central processing unit (CPU), a graphics processing unit (GPU), or a digital signal processor (DSP). However, the processing unit 12 may include electronic circuitry, such as an application specific integrated circuit (ASIC) or a field programmable gate array (FPGA). As one example, the processor may execute a program stored in a memory (which may be the storage unit 11), such as RAM. Here, a group of processors may be referred to as a "multiprocessor" or simply as a "processor".

The storage unit 11 stores a machine learning program 14. The machine learning program 14 may include source code written in a high-level language, and may include object code that has been compiled. The machine learning program 14 uses a machine learning library 13. The machine learning library 13 is a library program including one or more reusable modules that define typical processes used in machine learning. By using the machine learning library 13, a user is able to efficiently generate the machine learning program 14.

The machine learning library 13 may include modules corresponding to types of machine learning models or types of machine learning algorithms. As one example, the machine learning library 13 includes modules corresponding to machine learning models, such as neural networks, decision trees, and support vector machines. A module may include a function, and the machine learning program 14 may call the function of a module. A "module" may correspond to a class in an object-oriented language, and a "function" may correspond to a method in an object-oriented language. The functions may include a training function that trains a machine learning model, and may include a prediction function where a machine learning model outputs prediction data corresponding to input data.

Note that the machine learning model may be an image recognition model that determines an object class from image data. The machine learning model may also be a natural language processing model that performs natural language processing, such as named entity extraction, machine translation, a synonym search, and response text generation, on text data.

The processing unit 12 analyzes the machine learning program 14. When the machine learning program 14 does not include code for calculating a score, the processing unit 12 rewrites the machine learning program 14 to include code for calculating a score. By doing so, the machine learning program 14 is rewritten to become a machine learning program 15. The machine learning program 15 may include source code and may include object code. Note that the machine learning library 13 and the machine learning program 15 may be stored in the storage unit 11.

Based on the module names of modules included in the machine learning library 13, the processing unit 12 detects, from the machine learning program 14, code 14-1 that calls a training function for training a machine learning model. As one example, the processing unit 12 searches the machine learning program 14 for a statement including a module name to specify a variable indicating an instance of that module. The module name may be the name of a model module corresponding to a type of machine learning model, and the variable may be a model variable indicating an instance of that model module.

As one example, the processing unit 12 then detects the code 14-1 that calls a training function for an instance indicated by the variable. The training function optimizes parameter values included in the machine learning model to reduce the error between the prediction data generated from the input data and the correct answer data. The function name of the training function may be specified in advance or may be specified based on the machine learning library 13. The training function may be a "fit function".

To detect the code 14-1, the processing unit 12 may analyze a document indicating how to use the machine learning library 13 and extract a module name from this document. The processing unit 12 may detect the code 14-1 based on the module name extracted from the document. The document may be referred to as an "API (Application Programming Interface) document". The document may include module names of modules included in the machine learning library 13 and/or function names of functions included in the modules. Note that the "code" may include one or more instructions, or statements composed of one or more lines.

The processing unit 12 inserts code 15-2 before the code 14-1. As one example, the processing unit 12 inserts the code 15-2 immediately before the code 14-1. The code 15-2 splits the first training data passed to the training function by the code 14-1 into second training data and test data. The code 15-2 may call a split function defined in the machine learning library 13. As one example, the first training data includes a plurality of records which each include input data and correct answer data. The correct answer data may be referred to as a "Ground Truth", a "teacher label", or "teacher data". In this case, the code 15-2 sets some records out of the first training data as second training data and sets the remaining records as test data. As one example, the code 15-2 uses 10% of the records included in the first training data as test data.

The processing unit 12 rewrites the code 14-1 so that the second training data is passed to the training function in place of the first training data. By doing so, the code 14-1 is rewritten to become code 15-1. Note that in the code 15-2, the input data and correct answer data may be split into input data for use as training data, input data for use as test data, correct answer data for use as training data, and correct answer data for use as test data. In the code 15-1, the input data for use as training data and correct answer data for use as training data may be inputted into the training function.

The processing unit 12 inserts code 15-3 after the code 14-1. As one example, the processing unit 12 inserts the code 15-3 immediately after the code 14-1. The code 15-3 calculates a score based on the prediction data outputted by a machine learning model that has been trained and the correct answer data included in the test data. The score may indicate the prediction accuracy of a machine learning model, such as a percentage of correct answers. The code 15-3 may call a score function defined in the machine learning library 13. As one example, in the code 15-3, the prediction data outputted by the machine learning model and the correct answer data for use as test data are inputted into the score function.

To generate the prediction data, the processing unit 12 may search the machine learning program 14 for code for calling a prediction function. As one example, the processing unit 12 searches for the code for calling a prediction function for instances indicated by the same variable as the code 14-1. This prediction function may be a "predict function". When the code in question has been detected, the processing unit 12 may rewrite the detected code. When the code in question is not detected, the processing unit 12 may insert code for calling the prediction function. In the rewritten code or inserted code, the input data for use as test data may be inputted into the prediction function and prediction data outputted by the prediction function may be stored in a variable.

By doing so, a machine learning program 15 including the codes 15-1, 15-2, and 15-3 is generated. The processing unit 12 may store the generated machine learning program 15 in nonvolatile storage, display the machine learning program 15 on a display apparatus, and/or may transmit the machine learning program 15 to another information processing apparatus. The processing unit 12 may also calculate a score by executing the machine learning program 15. In that case, the processing unit 12 may store the calculated score in association with the machine learning program 14 or the machine learning program 15. The processing unit 12 may display the calculated score on a display apparatus and/or may transmit the calculated score to another information processing apparatus.

Note that the processing unit 12 may perform syntactic analysis of the machine learning program 14 to generate an abstract syntax tree (AST). An abstract syntax tree expresses the relationships between tokens, such as module names, function names, and variable names, in a tree structure. The processing unit 12 may use the generated abstract syntax tree to partially or entirely detect the code 14-1, insert the code 15-2, rewrite the code 14-1, and/or insert the code 15-3. The processing unit 12 may rewrite the abstract syntax tree, and may convert the rewritten abstract syntax tree into the machine learning program 15.

As described above, the information processing apparatus 10 according to the first embodiment detects the code 14-1, which calls the training function, from the machine learning program 14, based on a module name of a module included in the machine learning library 13. The information processing apparatus 10 inserts the code 15-2, which splits the first training data passed to the training function into the second training data and the test data, before the code 14-1. The information processing apparatus 10 rewrites the code 14-1 so as to pass the second training data to the training function. The information processing apparatus 10 inserts the code 15-3, which calculates a score based on the prediction data generated from the machine learning model and the input data included in the test data and correct answer data included in the test data, after the code 14-1.

By doing so, even when the machine learning program 14 is not written to calculate a score, a score for the machine learning program 14 is automatically calculated by executing the generated machine learning program 15. Accordingly, the burden of manually editing the machine learning program 14 is reduced. As one example, there are cases where a plurality of sample machine learning programs that have been assigned a score are used to tune AutoML, which generates a machine learning program from the task of a machine learning model and training data. In this case, the burden of manually editing the plurality of machine learning programs is reduced. An appropriate score indicating the prediction accuracy of the machine learning model is also calculated for the machine learning program 14.

Note that the information processing apparatus 10 may extract a module name from a document indicating how to use the machine learning library 13 and may search the machine learning program 14 for the extracted module name. By doing so, the code 14-1 for calling the training function is detected with high accuracy. The information processing apparatus 10 may perform syntactic analysis of the machine learning program 14 to generate an abstract syntax tree, and may perform processing, such as detection and rewriting of the code 14-1, using the abstract syntax tree. By doing so, the information processing apparatus 10 performs the processing described above with high accuracy independently of how the machine learning program 14 is written.

The information processing apparatus 10 may detect code for calling a prediction function from the machine learning program 14 and may rewrite the code so that input data included in the test data is passed to the prediction function. When doing so, the hyperparameter values inputted into the prediction function may be left unchanged. By doing so, prediction data corresponding to the input data is generated so as to be consistent with other code included in the machine learning program 14.

The module may be a class representing a machine learning model and the training function may be a method included in the class. By doing so, the code 14-1 that trains the machine learning model is detected with high accuracy. The information processing apparatus 10 may also execute the machine learning program 15 using the first training data, and may store a calculated score in association with the machine learning program 14. By doing so, a score is assigned to the machine learning program 14, which promotes other tasks, such as tuning of AutoML.

Second Embodiment

A second embodiment will now be described.

The information processing apparatus 100 according to the second embodiment collects a plurality of sample machine learning programs and assigns a score to each machine learning program. The information processing apparatus 100 uses a plurality of machine learning programs, which have been assigned scores, to train AutoML that generates a machine learning program according to a task. The information processing apparatus 100 uses the trained AutoML to generate a machine learning program in keeping with a desired task. The information processing apparatus 100 then executes the generated machine learning program to generate a machine learning model. However, the processing described above may be executed by a different information processing apparatus.

The information processing apparatus 100 may be a client apparatus or may be a server apparatus. The information processing apparatus 100 may be referred to as a "computer" or a "machine learning apparatus". The information processing apparatus 100 corresponds to the information processing apparatus 10 according to the first embodiment.

Figure 2:
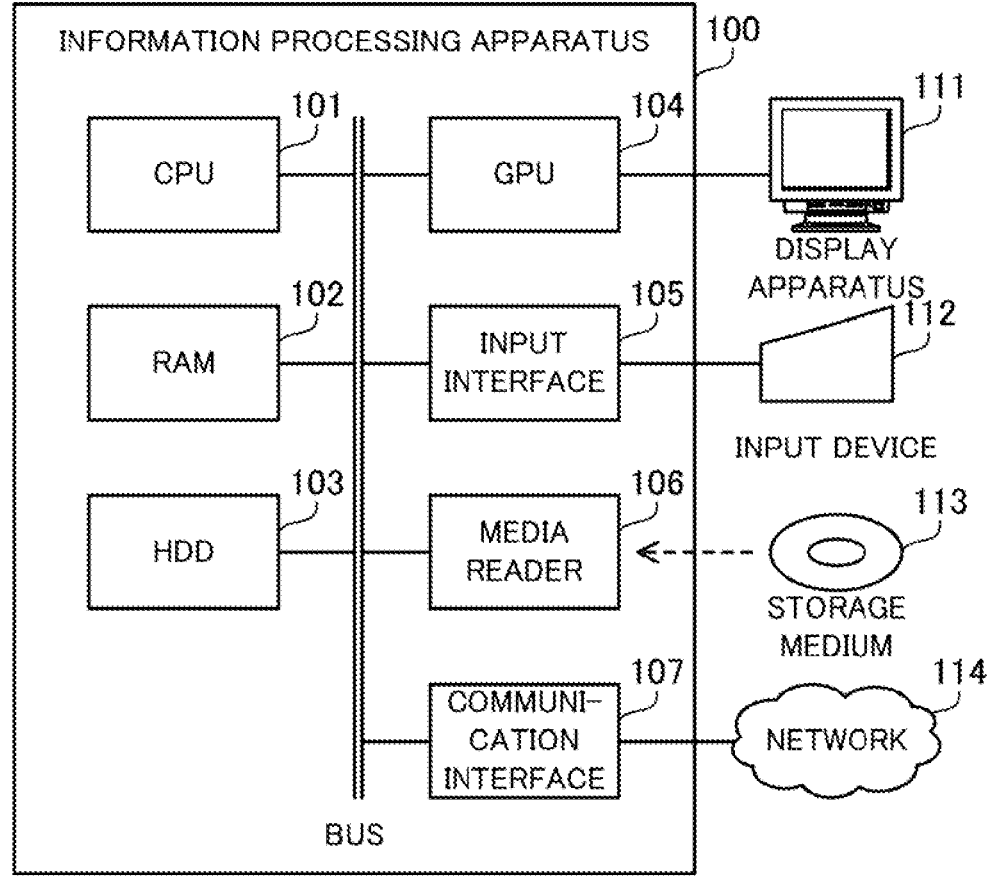
FIG. 2 depicts example hardware of an information processing apparatus according to the second embodiment.

FIG. 2 depicts example hardware of an information processing apparatus according to the second embodiment.

The information processing apparatus 100 includes a CPU 101, RAM 102, an HDD 103, a GPU 104, an input interface 105, a media reader 106, and a communication interface 107, which are connected to a bus. The CPU 101 corresponds to the processing unit 12 in the first embodiment. The RAM 102 or the HDD 103 corresponds to the storage unit 11 in the first embodiment.

The CPU 101 is a processor that executes instructions of a program. The CPU 101 loads a program and data stored in the HDD 103 into the RAM 102 and executes the program. The information processing apparatus 100 may include a plurality of processors.

The RAM 102 is a volatile semiconductor memory that temporarily stores a program to be executed by the CPU 101 and data used in computation by the CPU 101. The information processing apparatus 100 may have a different type of volatile memory aside from RAM.

The HDD 103 is nonvolatile storage that stores software programs, such as an operating system (OS), middleware, and application software, as well as data. The information processing apparatus 100 may have a different type of non-volatile storage, such as flash memory and/or a solid state drive (SSD).

The GPU 104 performs image processing in cooperation with the CPU 101 and outputs images to a display apparatus 111 connected to the information processing apparatus 100. As examples, the display apparatus 111 may be a cathode ray tube (CRT) display, a liquid crystal display, an organic electro luminescence (EL) display, or a projector. Another type of output device, such as a printer, may be connected to the information processing apparatus 100. The GPU 104 may also be used as a general purpose computing on graphics processing unit (GPGPU). The GPU 104 may execute a program according to instructions from the CPU 101. The information processing apparatus 100 may have other volatile semiconductor memory aside from the RAM 102 as GPU memory.

The input interface 105 receives an input signal from an input device 112 connected to the information processing apparatus 100. As examples, the input device 112 is a mouse, a touch panel, or a keyboard. A plurality of input devices may be connected to the information processing apparatus 100.

The media reader 106 is a reader device that reads programs and data that are recorded on a recording medium 113. As examples, the recording medium 113 is a magnetic disk, an optical disk, or semiconductor memory. Magnetic disks include flexible disks (FD) and HDD. Optical discs include compact discs (CD) and digital versatile discs (DVD). The media reader 106 copies the program and data read from the recording medium 113 into another recording medium, such as the RAM 102 or the HDD 103. The read program may be executed by the CPU 101.

The recording medium 113 may be a portable recording medium. The recording medium 113 may be used to distribute programs and data. The recording medium 113 and the HDD 103 may also be referred to as "computer-readable recording media".

The communication interface 107 communicates with other information processing apparatuses via a network 114. The communication interface 107 may be a wired communication interface connected to a wired communication apparatus, such as a switch or a router, or a wireless communication interface connected to a wireless communication apparatus, such as a base station or an access point.

Next, AutoML will be described.

Figure 3:
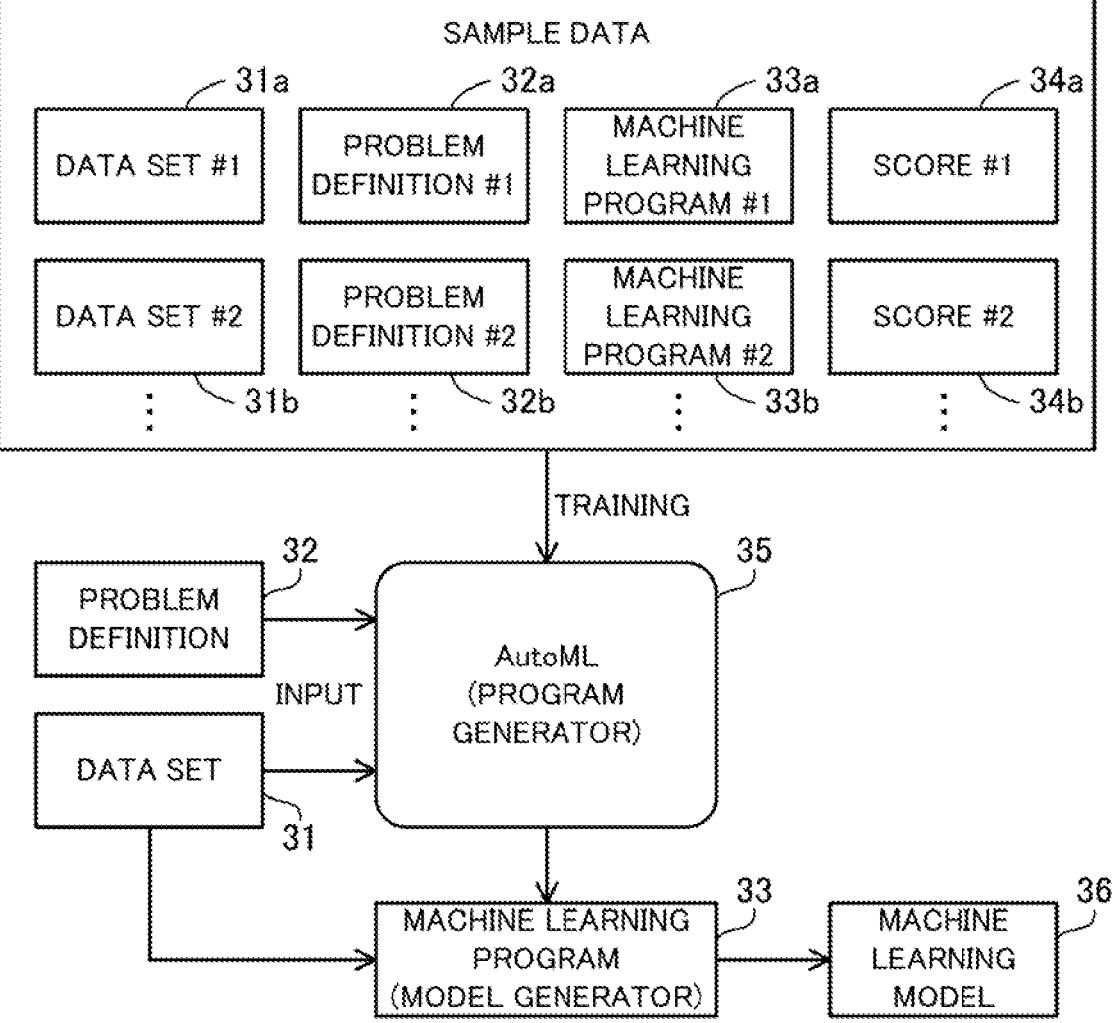
FIG. 3 depicts an example flow of machine learning using AutoML (Auto Machine Learning)

FIG. 3 depicts an example of the flow of machine learning using AutoML.

The information processing apparatus 100 collects sample data for training AutoML. In the sample data, a data set, a problem definition, a machine learning program, and a score are associated for each of a plurality of machine learning programs.

A data set is training data that is inputted into a machine learning program. A data set includes a plurality of records, and each record includes values in two or more columns. The data set may be tabular data. Some columns out of the two or more columns are used as explanatory variables, and the values of the explanatory variables are used as input data. Other columns out of the two or more columns are used as objective variables, and the values of the objective variables are used as correct answer data.

The problem definition indicates a prediction task to be performed by the machine learning model. As one example, the problem definition specifies a column corresponding to a target variable to be predicted by the machine learning model, out of the two or more columns included in the data set. A machine learning program is a script program that defines a machine learning procedure. A machine learning program is source code written in a high-level language. A machine learning program may use a machine learning library. The machine learning program may include specifying a preprocessing method for training data, specifying the structure of the machine learning model, specifying hyperparameter values for a machine learning algorithm, and the like.

The score is a measure of the prediction accuracy of a machine learning model generated by a machine learning program. Example indices used for the score include accuracy, precision, recall, F value, mean squared error (MSE), root mean squared error (RMSE), and coefficient of determination. When a machine learning program has been written to calculate a score for a trained machine learning model, the score calculated by that machine learning program is saved. On the other hand, when a machine learning program has not been written to calculate the score of the trained machine learning model, as described later, a score calculated by rewriting the machine learning program is saved.

For the machine learning program 33a, the sample data stores a data set 31a, a problem definition 32a, a machine learning program 33a, and a score 34a in association with each other. Likewise, for the machine learning program 33b, the sample data stores a data set 31b, a problem definition 32b, a machine learning program 33b, and a score 34b in association with each other. As one example, the sample data includes hundreds to tens of thousands of machine learning programs.

The information processing apparatus 100 trains AutoML 35 using this sample data. The AutoML 35 is a program generator that generates, from a data set 31 and a problem definition 32, a machine learning program 33 that trains a machine learning model 36 to solve the defined problem. The AutoML 35 is implemented as software including a program. The AutoML 35 may select a preprocessing method for generating input data for the machine learning model 36 from the data set 31. The preprocessing for the data set 31 may include selection of columns to be used as explanatory variables, normalization of column values, and the like.

The AutoML 35 may also select the structure of a machine learning model that is appropriate for the problem definition 32. The AutoML 35 may also select hyperparameter values for a machine learning algorithm to increase the prediction accuracy of the machine learning model 36. The AutoML 35 may generate the machine learning program 33 to perform a hyperparameter search.

When training the AutoML 35, the information processing apparatus 100 refers to the scores assigned to each machine learning program in the sample data. As one example, the information processing apparatus 100 analyzes the correlation between the code included in the machine learning programs and the scores, and learns how to write code that increases the score. As one example, the information processing apparatus 100 learns how to write a preferable machine learning program using machine learning programs with a high score, such as machine learning programs whose scores exceed a threshold. By doing so, the AutoML 35 generates the machine learning program 33 so that the prediction accuracy of the machine learning model 36 increases.

The machine learning program 33 is a model generator that uses the data set 31 to train the machine learning model 36. The machine learning program 33 is a script program that defines a preferable machine learning procedure for the data set 31 and the problem definition 32. The information processing apparatus 100 executes the machine learning program 33. The information processing apparatus 100 may compile the machine learning program 33 and convert the program into object code.

The machine learning program 33 inputs the input data into the machine learning model 36, calculates the error between the prediction data outputted by the machine learning model 36 and the correct answer data, and optimizes the parameter values of the machine learning model 36 to reduce the error. The trained machine learning model 36 generates and outputs prediction data from the input data.

Existing machine learning programs, such as the machine learning programs 33a and 33b, may be written so as to not calculate a score. On the other hand, when training the AutoML 35, reference is made to the scores of existing machine learning algorithms. For this reason, the information processing apparatus 100 rewrites and executes machine learning programs where a score is not automatically calculated so that after rewriting, a score is automatically calculated. The information processing apparatus 100 stores the calculated score and the original machine learning program so as to be associated with each other. By doing so, the collected machine learning programs are assigned scores and used to train the AutoML 35.

FIG. 4 depicts one example of an API document and a class name list.

To rewrite a machine learning program, the information processing apparatus 100 acquires an API document 131 of a machine learning library and generates a class name list 132 from the API document 131. When a plurality of machine learning libraries exist, the information processing apparatus 100 generates the class name list 132 from a plurality of API documents.

The machine learning library includes a plurality of classes defined by an object-oriented language. This plurality of classes includes model classes corresponding to types of machine learning models. As one example, the machine learning library includes model classes representing machine learning models such as classification neural networks, recurrent neural networks, classification decision trees, regression decision trees, and support vector machines.

A class contains one or more methods. As one example, a model class includes a fit function that receives input data and correct answer data as arguments and trains an instance of a machine learning model. Also as one example, a model class includes a predict function that receives input data as arguments and outputs prediction data generated by an instance of a machine learning model.

The API document 131 is a document indicating an interface for a machine learning library. Class names and types of each of a plurality of classes are written in the API document 131. Method names of the methods of each class are also written in the API document 131. The information processing apparatus 100 extracts the class names of model classes from the API document 131 and adds the extracted class names to the class name list 132. The information processing apparatus 100 does not have to extract class names of classes aside from model classes. Where there are a plurality of API documents, the class name list 132 may include class names extracted from different API documents.

Figure 5:
FIG. 5 depicts an example rewriting of a machine learning program.

FIG. 5 depicts an example rewriting of a machine learning program.

The information processing apparatus 100 refers to the class name list 132 described earlier and rewrites a machine learning program 133 to become a machine learning program 134. Although the machine learning program 133 does not calculate a score, the machine learning program 134 calculates a score.

A statement for generating an instance of a model class and substituting it into a model variable is written on the first line of the machine learning program 133. A statement for calling the fit function of the instance indicated by the model variable is written on the third line of the machine learning program 133. At this time, input data X and correct answer data y are passed as arguments to the fit function. A statement for calling the predict function of the instance indicated by the model variable and substitutes the prediction data into a data variable is written on the fifth line of the machine learning program 133. At this time, certain input data and hyperparameter values are passed as arguments to the predict function.

First, the information processing apparatus 100 searches the machine learning program 133 for class names included in the class name list 132. When any class name in the class name list 132 is detected, the information processing apparatus 100 specifies the code that generates an instance of a model class for the detected class name, and specifies a model variable into which the instance is substituted. Here, the model variable is specified from the first line of the machine learning program 133.

Next, the information processing apparatus 100 detects code for calling the fit function of an instance indicated by the model variable from the machine learning program 133, and specifies the input data and the correct answer data to be passed to the fit function. Here, the input data X and the correct answer data y are specified from the third line of the machine learning program 133.

Next, the information processing apparatus 100 generates code for splitting the group of records in the input data into data for training use and data for testing use and also splits the group of records in the correct answer data into data for training use and data for testing use, and inserts the generated code just before the function call for the fit function. When splitting the data, as one example, a "split function" defined in the machine learning library is used. The ratio of the number of data records for training to the number of data records for testing is 9:1, for example. Next, the information processing apparatus 100 changes the input data passed to the fit function to the input data for training use produced by the splitting described above, and changes the correct answer data passed to the fit function to the correct answer data for training use produced by the splitting. By doing so, the third and fourth lines of the machine learning program 134 are generated.

Next, the information processing apparatus 100 searches the machine learning program 133 for code for calling the predict function of an instance indicated by the model variable. When code for calling the predict function is detected, the information processing apparatus 100 copies the detected code and inserts the code immediately after the detected code. In the copied code, the information processing apparatus 100 changes the input data to be passed to the predict function to the input data for testing use produced by the splitting described above, and changes the data variable into which the prediction data is to be substituted to a new data variable. When doing so, other arguments, such as hyperparameter values, are carried over without being changed.

On the other hand, when code for calling the predict function has not been detected, the information processing apparatus 100 generates code for calling the predict function of an instance indicated by the model variable, and inserts the code immediately after a call of the fit function. The generated code passes the input data for testing use produced by the splitting described above as arguments to the predict function, and substitutes the prediction data into a new data variable that is not included in the machine learning program 133. When the predict function has other arguments, specified initial values are substituted into these other arguments. In this example, the fifth line of the machine learning program 133 is copied and the seventh line of the machine learning program 134 is generated.

Next, the information processing apparatus 100 generates code for calculating a score by comparing the prediction data substituted into a data variable and the correct answer data for testing use produced by the splitting described above, and inserts the code immediately after the call of the predict function. As one example, the score is the percentage of correct answers. When calculating the score, a score function defined in the machine learning library is used for example. In this case, the generated code passes the prediction data and correct answer data as arguments to the score function. By doing so, the ninth line of the machine learning program 134 is generated.

There are cases where machine learning programs which indicate effectively the same machine learning procedure are written differently. To flexibly cope with such variations in how programs are written, the information processing apparatus 100 performs the detection and rewriting of code described above on an abstract syntax tree, not directly on the text of the source code as it is. When rewriting the machine learning program 133 into the machine learning program 134, the information processing apparatus 100 performs syntactic analysis of the machine learning program 133 to generate an abstract syntax tree. An abstract syntax tree is tree-structured data that indicates relationships between syntactic elements, such as expressions, variables, classes, methods, and operators.

The information processing apparatus 100 performs pattern matching on the abstract syntax tree to detect a subtree corresponding to specified code. The information processing apparatus 100 rewrites the code by rewriting the detected subtree. The information processing apparatus 100 inserts code by inserting a new subtree into the abstract syntax tree based on the position of the detected subtree. The information processing apparatus 100 then converts the rewritten abstract syntax tree into source code.

Figure 6:
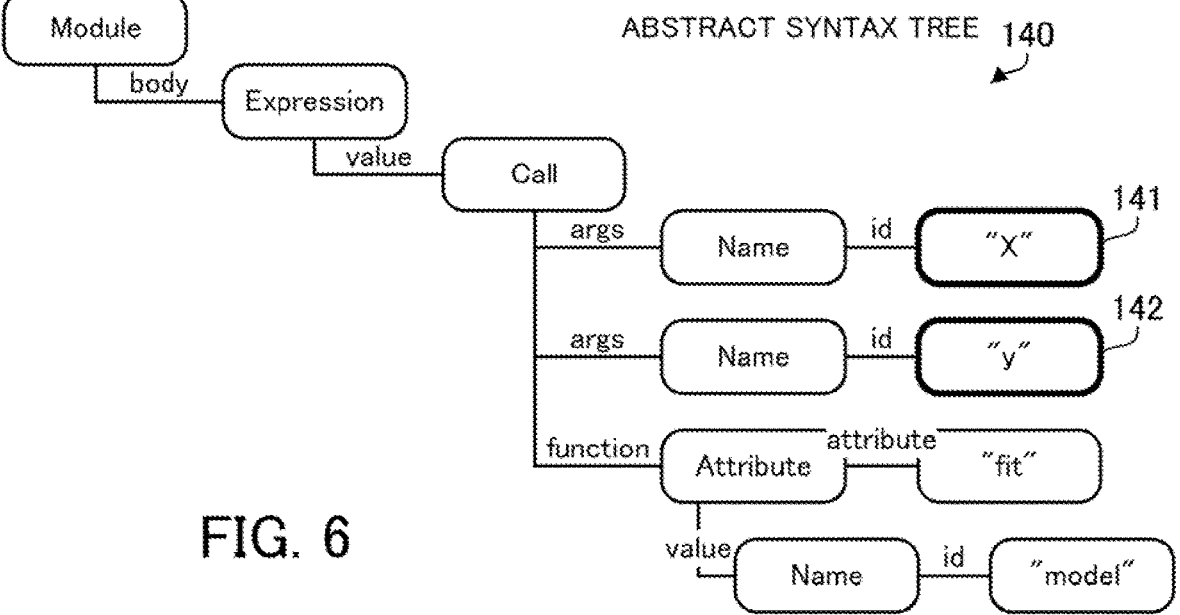
FIG. 6 depicts an example of an abstract syntax tree before rewriting.

FIG. 6 depicts an example of the abstract syntax tree before rewriting.

The abstract syntax tree 140 corresponds to the machine learning program 133. FIG. 6 depicts a part corresponding to the third line of the machine learning program 133, out of the entire abstract syntax tree 140. A node 141 indicates the input data X, which is the first argument of the fit function. A node 142 indicates the correct answer data y, which is the second argument of the fit function.

Figure 7:
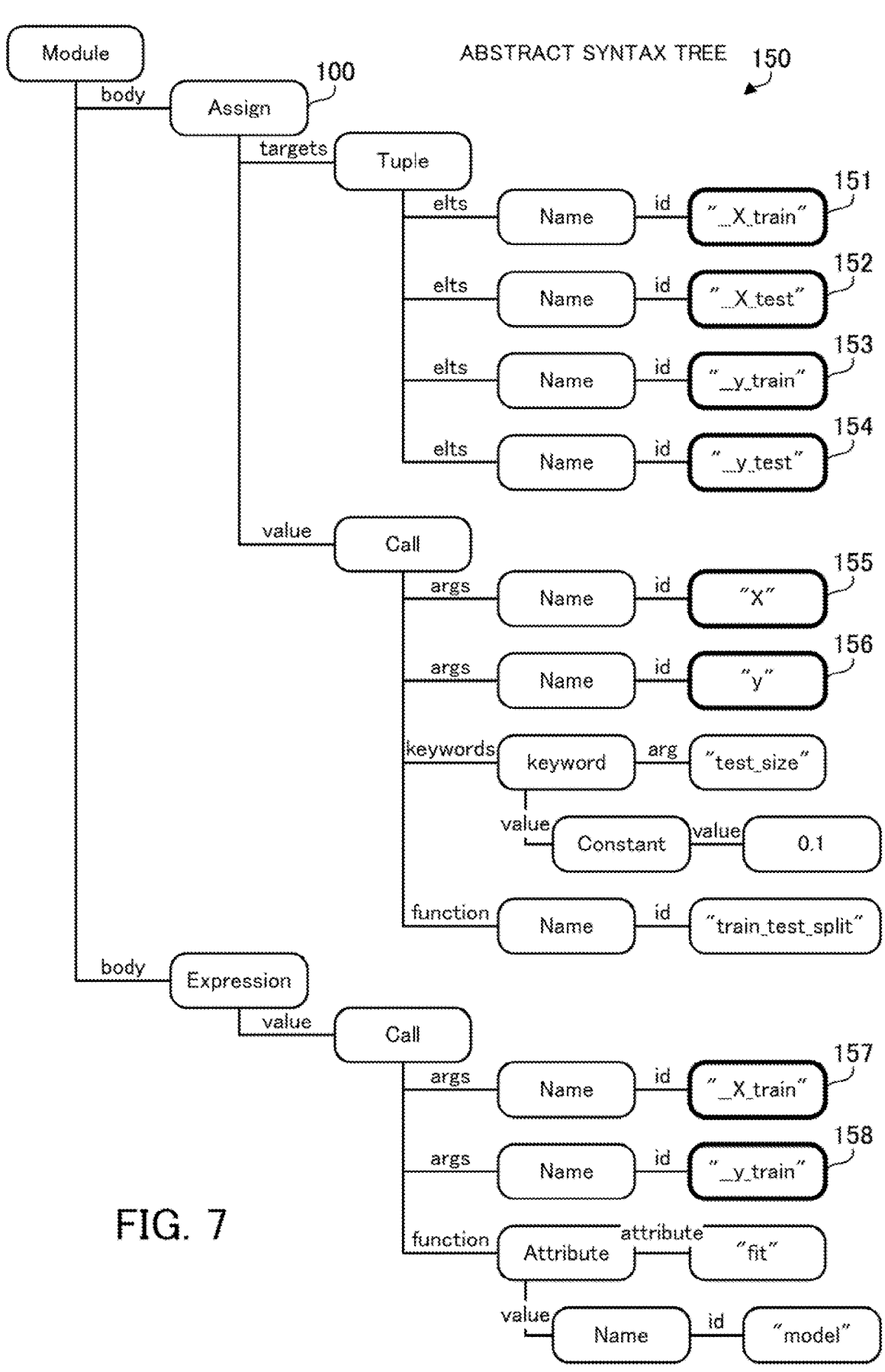
FIG. 7 depicts an example of the abstract syntax tree after rewriting.

FIG. 7 depicts an example of the abstract syntax tree after rewriting.

The abstract syntax tree 150 corresponds to the machine learning program 134. FIG. 7 depicts a part corresponding to the third and fourth lines of the machine learning program 134, out of the entire abstract syntax tree 150. By rewriting the abstract syntax tree 140, an abstract syntax tree 150 is generated.

A node 151 indicates data variables that store records that have been split into training data, out of the input data X. The node 152 indicates data variables that store records that have been split into test data, out of the input data X. The node 153 indicates data variables that store records that have been split into training data, out of the correct answer data y. The node 154 indicates data variables that store records that have been split into test data, out of the correct answer data y. A subtree that includes the nodes 151, 152, 153, and 154 is newly added to the abstract syntax tree 150.

A node 155 indicates the input data X, which is the first argument of the split function. A node 156 indicates the correct answer data y, which is the second argument of the split function. A subtree that includes the nodes 155 and 156 is newly added to the abstract syntax tree 150.

A node 157 indicates input data for training purposes, which is the first argument of the fit function. The node 157 indicates the same data variables as the node 151. The node 158 indicates the correct answer data for training purposes, which is the second argument of the fit function. The node 158 indicates the same data variables as the node 153. A subtree including the nodes 157 and 158 is produced by rewriting a subtree included in the abstract syntax tree 140. The node 157 corresponds to the node 141 in the abstract syntax tree 140. The node 158 corresponds to the node 142 in the abstract syntax tree 140. The information processing apparatus 100 rewrites the nodes 141 and 142 into the nodes 157 and 158.

Next, the functions and processing procedure of the information processing apparatus 100 will be described.

Figure 8:
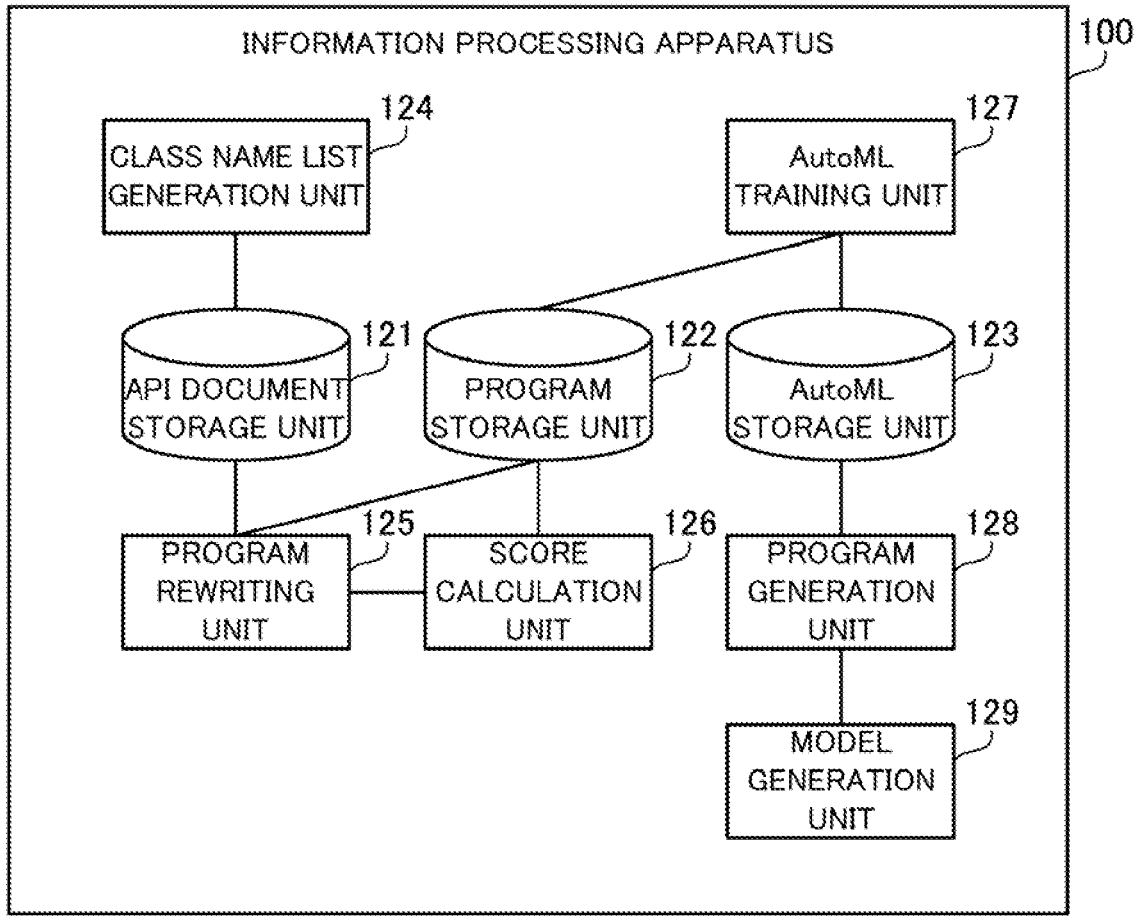
FIG. 8 is a block diagram depicting example functions of an information processing apparatus.

FIG. 8 is a block diagram depicting example functions of an information processing apparatus.

The information processing apparatus 100 has an API document storage unit 121, a program storage unit 122, and an AutoML storage unit 123. These storage units are implemented using the RAM 102 or the HDD 103, for example. The information processing apparatus 100 also includes a class name list generation unit 124, a program rewriting unit 125, a score calculation unit 126, an AutoML training unit 127, a program generation unit 128, and a model generation unit 129. As one example, these processing units are implemented using the CPU 101 or GPU 104 and programs.

The API document storage unit 121 stores one or more API documents, which indicate interfaces for one or more machine learning libraries. The API document storage unit 121 also stores a class name list listing class names that have been extracted from the one or more API documents. The program storage unit 122 stores a plurality of machine learning programs that have been collected as samples. In addition, the program storage unit 122 stores, in association with each machine learning program, a data set to be inputted into that machine learning program, a problem definition indicating a task for machine learning, and a score of a trained machine learning model.

The AutoML storage unit 123 stores an AutoML program and data. The AutoML generates a machine learning program from a data set and a problem definition. The class name list generation unit 124 searches the API documents stored in the API document storage unit 121 for model classes corresponding to types of machine learning model, and extracts the class names of the model classes. The class name list generation unit 124 adds the extracted class names to the class name list.

The program rewriting unit 125 extracts a machine learning program that does not include code for outputting a score, out of the machine learning programs stored in the program storage unit 122. The program rewriting unit 125 refers to the class name list stored in the API document storage unit 121, rewrites the extracted machine learning program, and passes the rewritten program to the score calculation unit 126. The program rewriting unit 125 may store the rewritten machine learning program in non-volatile storage, may display the program on the display apparatus 111, and/or may transmit the program to another information processing apparatus.

The score calculation unit 126 inputs the corresponding data set into the machine learning program stored in the program storage unit 122 and executes the machine learning program to calculate a score. The score calculation unit 126 stores the calculated score in association with the machine learning program.

However, for a machine learning program that does not include code for outputting a score, the score calculation unit 126 receives a rewritten machine learning program from the program rewriting unit 125. The score calculation unit 126 executes the rewritten machine learning program in place of the original machine learning program to calculate a score corresponding to the original machine learning program. The score calculation unit 126 may store the calculated score in non-volatile storage, may display the score on the display apparatus 111, and/or may transmit the score to another information processing apparatus.

The AutoML training unit 127 trains the AutoML stored in the AutoML storage unit 123 using the data set, the problem definition, the machine learning program, and the score stored in the program storage unit 122. At this time, the AutoML training unit 127 analyzes the relationship between the code included in the machine learning program and the score, and detects patterns of code that contribute to improving the score. By doing so, the AutoML is trained to generate high-quality machine learning programs that generate high-scoring machine learning models.

The program generation unit 128 receives a data set and a problem definition. The program generation unit 128 generates a machine learning program by inputting the data set and the problem definition into the AutoML stored in the AutoML storage unit 123. The program generation unit 128 passes the generated machine learning program to the model generation unit 129. The program generation unit 128 may store the generated machine learning program in non-volatile storage, may display the program on the display apparatus 111, and/or may transmit the program to another information processing apparatus.

The model generation unit 129 inputs the data set into the machine learning program and executes the machine learning program to generate a trained machine learning model. The model generation unit 129 may store the trained machine learning model in non-volatile storage, may display the model on the display apparatus 111, and/or may transmit the model to another information processing apparatus.

Figure 9:
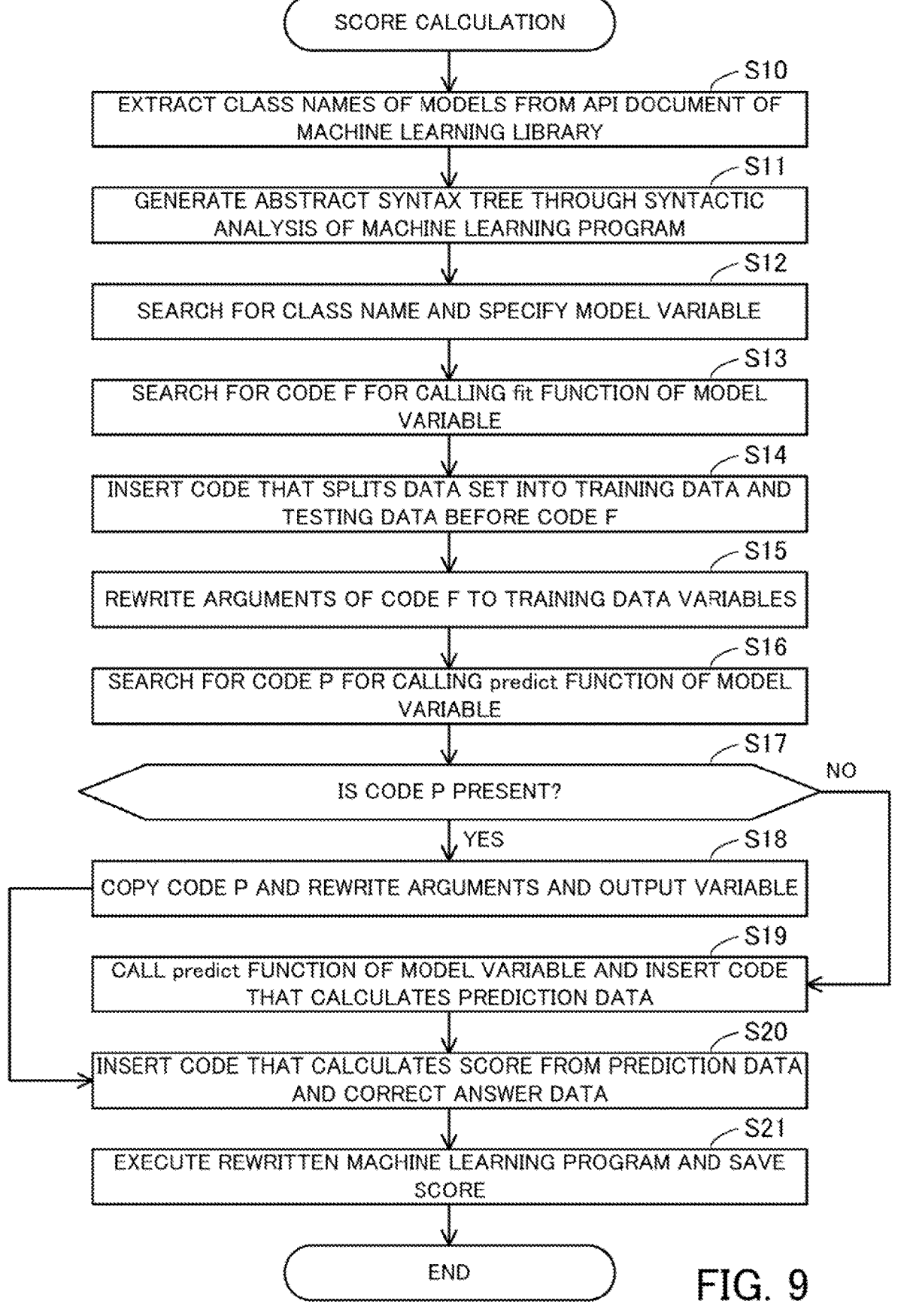
FIG. 9 is a flowchart depicting an example procedure for score calculation.

FIG. 9 is a flowchart depicting an example procedure for score calculation.

(S10) The class name list generation unit 124 extracts class names of model classes corresponding to types of machine learning models from an API document for a machine learning library. The class name list generation unit 124 generates a class name list which lists the extracted class names.

(S11) The program rewriting unit 125 generates an abstract syntax tree through syntactic analysis of machine learning programs. The following steps S12 to S20 are performed on the abstract syntax tree. Note that steps S11 to S21 are executed for each of the plurality of machine learning programs.

(S12) The program rewriting unit 125 searches the machine learning program for any one of the class names listed in the class name list. The program rewriting unit 125 specifies a model variable into which an instance of a model class is substituted.

(S13) The program rewriting unit 125 searches the machine learning program for code F for calling the fit function for a model variable specified in step S12.

(S14) The program rewriting unit 125 specifies the data set to be passed to the fit function by the code F. The program rewriting unit 125 inserts code which splits the data set into training data and test data before the code F.

(S15) The program rewriting unit 125 rewrites the arguments of the code F into data variables indicating the training data produced by the splitting in step S14.

(S16) The program rewriting unit 125 searches the machine learning program for code P for calling the predict function for the model variable specified in step S12.

(S17) The program rewriting unit 125 determines whether the code P is present in the machine learning program. When the code P is present, the processing proceeds to step S18. When the code P is not present, the processing proceeds to step S19.

(S18) The program rewriting unit 125 copies the code P and inserts the copied code after the code P. The program rewriting unit 125 rewrites the arguments of the copied code into data variables indicating the input data included in the test data split in step S14. The program rewriting unit 125 also rewrites the output variable into which the prediction data is to be substituted into a new data variable that differs from the other variables. The processing then proceeds to step S20.

(S19) The program rewriting unit 125 generates code for calling the predict function for the model variable specified in step S12 and inserts the code after the code F. In the generated code, the input data included in the test data is passed as an argument to the predict function, and the prediction data outputted by the predict function is substituted into the new data variable.

(S20) The program rewriting unit 125 generates code for calculating a score by comparing the prediction data outputted by the predict function and the correct answer data included in the test data produced by the splitting in step S14. The program rewriting unit 125 inserts the generated code after the code of step S18 or step S19.

(S21) The program rewriting unit 125 converts the rewritten abstract syntax tree into source code of a machine learning program. The score calculation unit 126 calculates a score by executing the rewritten machine learning program using the saved data set. The score calculation unit 126 stores the calculated score in association with the original machine learning program.

As described above, the information processing apparatus 100 according to the second embodiment uses the AutoML to select appropriate data preprocessing, a model structure, and hyperparameter values in keeping with the data set and the problem definition and thereby generates a machine learning program. Doing so reduces the amount of trial and error performed by a user who has a computer perform machine learning, and thereby reduces the burden on the user.

In addition, the information processing apparatus 100 trains the AutoML using the sample machine learning programs that have been assigned scores. By doing so, AutoML is trained to produce a high-quality machine learning program that produces high-scoring machine learning models. The information processing apparatus 100 rewrites a machine learning program that is not written to calculate a score of a trained machine learning model so that a score is calculated and executes the rewritten machine learning program. By doing so, the burden of manually editing a machine learning program is reduced and an appropriate score is assigned to the machine learning program.

The information processing apparatus 100 also extracts the class names of model classes from API documents and searches for the extracted class names from the machine learning programs to specify model variables. By doing so, the model variables are specified efficiently and with high accuracy. The information processing apparatus 100 also performs syntactic analysis of the machine learning program to generate an abstract syntax tree and searches and rewrites code on the abstract syntax tree. By doing so, searching and rewriting of code are performed efficiently and with high accuracy without being dependent on how the machine learning programs are written.

The information processing apparatus 100 rewrites the machine learning program so as to split off part of the inputted data set as test data and calculates a score. By doing so, there is no need to separately prepare test data, and the score of the machine learning model is calculated within a range of a data set that has been collected by machine learning programs. When the machine learning program includes code for calling a predict function, the information processing apparatus 100 copies that code and rewrites the code into code for generating desired prediction data. By doing so, the other arguments are carried over and consistency with surrounding code is maintained.

According to one aspect of the present embodiments, it is possible to calculate a score for an existing machine learning program.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A non-transitory computer-readable recording medium storing therein a computer program that causes a computer to execute a process comprising:

detecting, based on a module name of a module included in a machine learning library, first code for calling a training function for training a machine learning model from a machine learning program that uses the machine learning library;

inserting, before the first code, second code for splitting first training data passed to the training function by the first code into second training data and test data;

rewriting the first code to pass the second training data to the training function; and inserting, after the first code, third code for calculating a score based on prediction data, which is generated from the machine learning model that has been trained and input data included in the test data, and correct answer data included in the test data.

2. The non-transitory computer-readable recording medium according to claim 1, wherein the process further includes extracting the module name from a document indicating how to use the machine learning library, and the detecting of the first code includes searching the machine learning program for the module name extracted from the document.

3. The non-transitory computer-readable recording medium according to claim 1, wherein the detecting of the first code includes performing syntactic analysis of the machine learning program to generate an abstract syntax tree and detecting the first code using the abstract syntax tree.

4. The non-transitory computer-readable recording medium according to claim 1, wherein the inserting of the third code includes detecting, from the machine learning program, fourth code for calling a prediction function that generates the prediction data using the machine learning model and rewriting the fourth code to pass the input data to the prediction function.

5. The non-transitory computer-readable recording medium according to claim 1, wherein the module is a class that expresses the machine learning model and the training function is a method included in the class.

6. The non-transitory computer-readable recording medium according to claim 1, wherein the process further includes executing the machine learning program that has been rewritten using the first training data and storing the score that has been calculated in association with the machine learning program before rewriting.

7. A rewriting method comprising:

detecting, by a processor and based on a module name of a module included in a machine learning library, first code for calling a training function for training a machine learning model from a machine learning program that uses the machine learning library;

inserting, by the processor and before the first code, second code for splitting first training data passed to the training function by the first code into second training data and test data;

rewriting, by the processor, the first code to pass the second training data to the training function; and inserting, by the processor and after the first code, third code for calculating a score based on prediction data, which is generated from the machine learning model that has been trained and input data included in the test data, and correct answer data included in the test data.

8. An information processing apparatus comprising:

a memory configured to store a machine learning program that uses a machine learning library; and a processor coupled to the memory and the processor configured to:

detect, based on a module name of a module included in the machine learning library, first code for calling a training function for training a machine learning model from the machine learning program;

insert, before the first code, second code for splitting first training data passed to the training function by the first code into second training data and test data;

rewrite the first code to pass the second training data to the training function; and insert, after the first code, third code for calculating a score based on prediction data, which is generated from the machine learning model that has been trained and input data included in the test data, and correct answer data included in the test data.

\* \* \* \* \*